(12) United States Patent
Kodaka et al.

(10) Patent No.: US 7,120,603 B2
(45) Date of Patent: Oct. 10, 2006

(54) RESERVATION METHOD, RESERVATION AUTHENTICATION METHOD, RESERVATION CONFIRMATION METHOD, RESERVATION SERVERS, SHOP TERMINALS, PORTABLE TERMINALS AND MEMORY MEDIA

(75) Inventors: Toshihiro Kodaka, Kawasaki (JP); Hitoshi Monma, Kawasaki (JP); Mitsuru Nakajima, Kawasaki (JP); Mikako Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 619 days.

(21) Appl. No.: 09/907,655

(22) Filed: Jul. 19, 2001

(65) Prior Publication Data

US 2002/0035691 A1     Mar. 21, 2002

Related U.S. Application Data

(63) Continuation of application No. PCT/JP00/06469, filed on Sep. 21, 2000.

(51) Int. Cl.
*G06Q 99/00* (2006.01)

(52) U.S. Cl. .............. 705/50; 705/64; 705/75; 705/5; 705/6; 705/65; 713/182; 380/247; 380/277; 726/4; 726/2; 726/28

(58) Field of Classification Search ............... 705/5, 705/50, 71, 76, 75, 64, 65, 6, 60; 380/247, 380/277; 726/2, 4, 28; 713/182
See application file for complete search history.

(56) References Cited

U.S. PATENT DOCUMENTS 6,454,174 B1 *  9/2002  Sansone .................. 235/494
6,477,503 B1    11/2002  Mankes 2001/0018660 A1 *  8/2001  Sehr ..................... 705/5
2001/0034717 A1 * 10/2001  Whitworth ............. 705/64
2002/0010604 A1 *  1/2002  Block ................... 705/6
2003/0149662 A1 *  8/2003  Shore ................... 705/39

FOREIGN PATENT DOCUMENTS

| JP | 6-60083   | 3/1994  |
| JP | 8-110923  | 4/1996  |
| JP | 8-130536  | 5/1996  |
| JP | 8-315191  | 11/1996 |

(Continued)

OTHER PUBLICATIONS

O'Mahony et al. "Electronic Payment Systems", 1997, Artech House, Inc. p. 30.*

(Continued)

*Primary Examiner*—James Trammell
*Assistant Examiner*—Jalatee Worjloh
(74) *Attorney, Agent, or Firm*—Staas & Halsey LLP

(57) ABSTRACT

The present invention relates to a system wherein each of a reservation server that makes reservations of sales and purchases, a portable terminal owned by a user who makes a reservation, and a shop terminal provided in stores where goods are sold, and a service or entertainment is provided, is connected to a communication network whereby the user makes a reservation for sales or purchase by accessing the reservation server, the reservation server encrypts contents of the sales/purchase reservation and transmits the encrypted reservation information to the aforementioned portable terminal, the user presents the transmitted encrypted reservation information to the shop terminal, visiting the shop terminal, and the shop terminal accesses the reservation server to confirm whether the presented encrypted reservation information is legitimate or not and admits the presenter of the encrypted reservation information if the reservation information is legitimate.

23 Claims, 9 Drawing Sheets

FOREIGN PATENT DOCUMENTS

| | | |
|---|---|---|
| JP | 11-184935 | 7/1999 |
| JP | 2000-105844 | 4/2000 |

OTHER PUBLICATIONS

Keitai Watch Publishing, "Verdy Kawasaki, making 'i-mode screen' Tocket Window" [Online], Impress Corporation, Apr. 24, 2000, obtained on Dec. 4, 2000 from the following website <URL:http://K-Kai.impress.co.jp/new/2001_24/verdy.htm>.

Nikkei Industry News Paper No. 7503, May 12, 2000, Tokyo, "Offering Tickets Through 'i-mode', Verdy Kawasaki Official Website for Tickets" p. 18.

* cited by examiner

FIG.2

| ORIGINATING NUMBER | SEAT NUMBER | RESERVATION NUMBER | DATA AND TIME | INSTITUTION NAME | SALES AGENT |
|---|---|---|---|---|---|
| 090-1111-1111 | AK001 | 083058829 | ××××  | ○○○○ | 1234 |
| ..... | ..... | ..... | ..... | ..... | ..... |

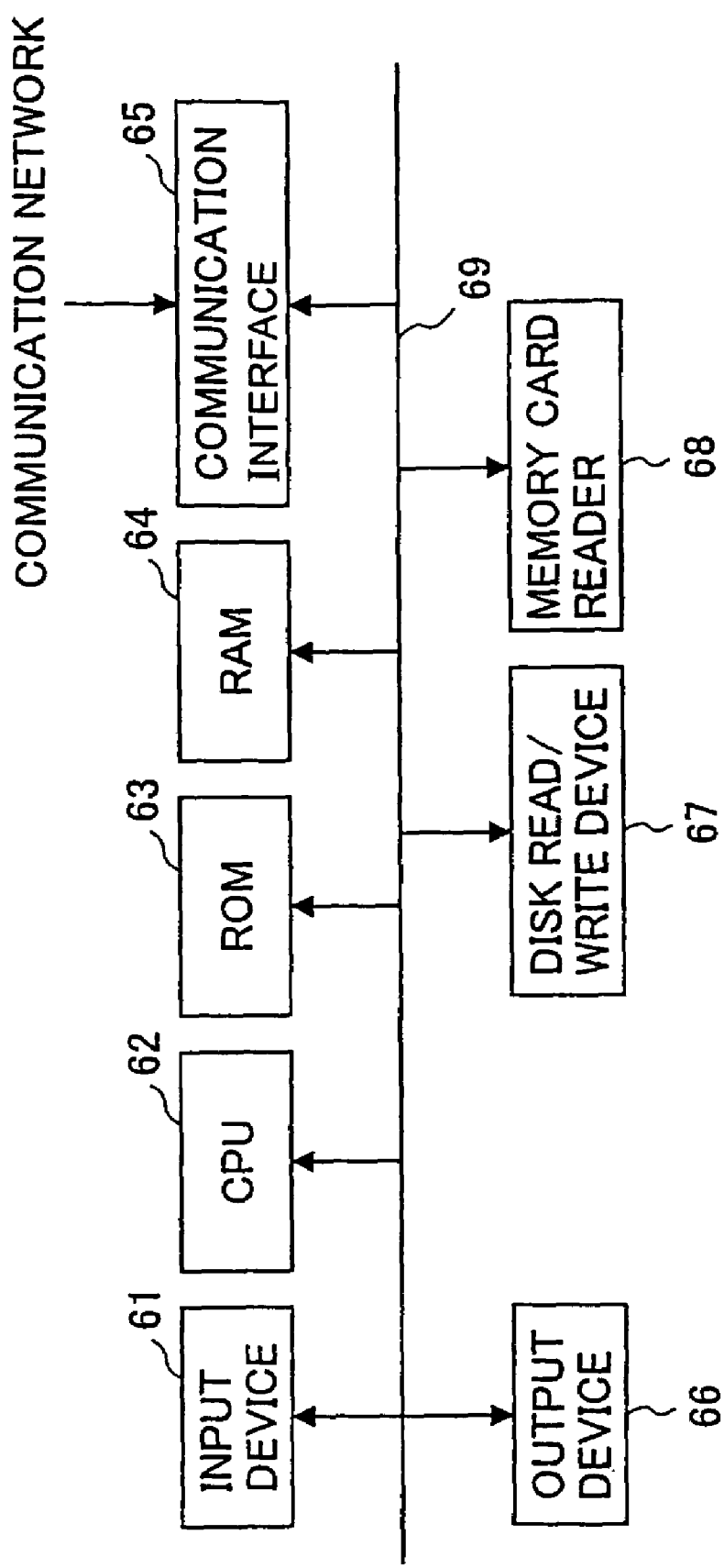

RESERVATION METHOD, RESERVATION AUTHENTICATION METHOD, RESERVATION CONFIRMATION METHOD, RESERVATION SERVERS, SHOP TERMINALS, PORTABLE TERMINALS AND MEMORY MEDIA

This application is a continuing application filed under 35 U.S.C. §111(a), based upon International Application PCT/JP00/06469, filed Sep. 21, 2000.

FIELD OF TECHNOLOGY

The present invention relates to a reservation method, a reservation authentication method, a reservation confirmation method, reservation servers, shop terminals, portable terminals and memory media, and particularly relates to the reservation method, the reservation authentication method, the reservation confirmation method, the reservation servers, the shop terminals, the portable terminals and the memory media that enable reservations for goods sales and purchases, reservations to receive services and reservations to receive entertainment services reliably and conveniently.

BACKGROUND TECHNOLOGY

On-line sales and purchases are being conducted popularly using the Internet. For example, ticket purchases can be made by accessing web servers that sell tickets for movies, music concerts, theater plays, sports and the like. One can also make an on-line reservation for a car rental or the like. Further, a reservation of merchandise sales and purchases can be made on-line via the Internet. Here, in the ticket sales on the Internet, tickets have to be delivered directly to users who reserved the ticket purchase, for which the burden of ticket distribution and time needs to be spared. Because of the time required to receive the ticket, the ticket cannot be reserved and sold for events of the same day. Further, confirmations of reservations for car rentals and the like and merchandise sales and purchases have been troublesome.

DISCLOSURE OF THE INVENTION

The present invention is to enable reservations of goods sales and purchases, reservations to receive services and reservations to enjoy an entertainment reliably and conveniently in view of the problems described above.

In order to achieve these purposes, the present invention provides reservation servers that make reservations of sales and purchases, portable terminals owned by users who make reservations of sales and purchases, shop terminals installed in stores that provide goods sales, services and entertainment, all of which are connected to a communication network to make a system to provide on-line transactions, wherein the users access the reservation servers to reserve sales and purchases, the reservation servers encrypt contents of the reserved sales and purchase and advise the reservation information to the portable terminals, the users come to the shop terminals to present the communicated encrypted reservation information to the shop terminals, and the shop terminals access the reservation servers to check legitimacy of the presented encrypted reservation information and, if the reservation information is legitimate, admit the users.

In this manner, the encrypted reservation information has a facility equivalent to that of tickets. Consequently, the tickets are generated electronically and transmitted electronically to enable a quick acquisition of the tickets, making it possible to sell tickets until the last moment of performances.

BRIEF DESCRIPTION OF THE DRAWINGS

Other purposes, features and benefits of the present invention will be further clarified by reading descriptions that follow with reference to accompanying drawings.

FIG. 2 is to explain a sample of a reservation database of the reservation server.

FIG. 11 explains an example of a hardware structure of the reservation server, the shop terminal and the portable terminal.

DESCRIPTION OF THE PREFERRED EMBODIMENTS

In the following, embodiments of the present invention will be described with reference to the accompanying drawings.

Figure 1:
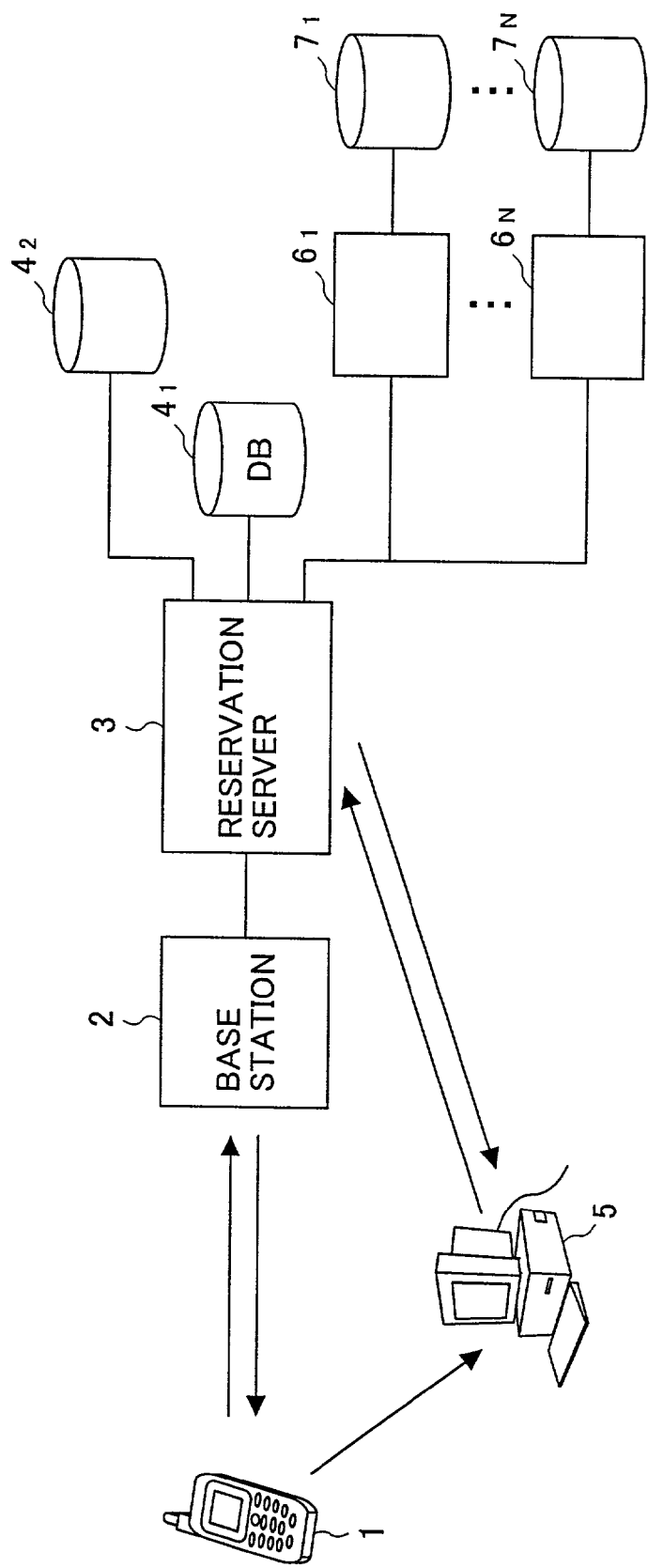
FIG. 1 shows an example of a system structure of the present invention.

FIG. 1 shows an example of a system structure of the present invention. An example of selling tickets for movies, concerts, theater plays, sports and the like is described.

The system includes a portable terminal 1 that is owned by a user who purchases a ticket, a base station 2 that is a wireless base station belonging to a portable wireless telephone system and communicating wirelessly with the portable terminal 1, a reservation server 3 of a ticket sales agent, a reservation database $4_1$ that is provided in the reservation server 3, a service database $4_2$, a shop terminal 5 that is installed in a store where goods sales and purchases are conducted, host computers $6_1$ through $6_N$ that belong to sellers that sell tickets for movies, concerts, theater plays, sports and the like, databases $7_1$ through $7_N$ that are connected to the host computers $6_1$ through $6_N$ of the sellers.

The reservation database $4_1$ that is provided in the reservation server 3 is a database which stores reservation related information that includes, for example as shown in FIG. 2, a generating number, a seat number, a reservation number, a date, an institution name and a name of a seller.

The generating number is a generating number of a portable terminal when a user makes the reservation using the portable terminal. If the user uses another terminal to make a reservation, a number of a portable terminal designated by the reserving person is stored. To the seat number, the reserved seat number is stored. To the reservation number, a number corresponding to the reservation is stored.

A reservation can be identified by the reservation number. The date stores the date and time of occupancy of the reserved seat. To the institution name, a name (or other identifiers) that specifies the institution, or an ID of the institution that provides the seat is stored. To the name of a seller, the name of the seller (or other identifiers) that specifies the seller, or an ID of the ticket seller is stored.

In the reservation database $4_1$, other reservation related information may be stored, such as a reservation date, a name of reserving person, an ID number of the portable terminal and the like, as required.

The service database $4_2$ stores basic information about tickets offered by acquiring the information from the sellers' host computers $6_1$ through $6_N$. For example, if it is relative to offering entertainment, information about a seller, an event name, an institution to use, an event date and time, a number of seats, a seat map, a reservation status and the like are stored.

The reservation server 3 of a sales agent that sells tickets opens a homepage on the Internet. The reservation server 3 presents a reservation screen that enables a reservation of tickets for movies, concerts, theater plays, sports and the like of a plurality of sellers.

The reservation server 3 automatically creates all or a part of the reservation screen using the service database $4_2$. Users can reserve a desired ticket by clicking the reservation screen.

When a reservation is made, contents of the reservation database $4_1$ are updated automatically.

Further, the base station 2 and the reservation server are connected via such a communication network as a portable wireless telephone network, a fixed telephone network and the like. In the same manner, the shop terminal 5 and the reservation server 3 are connected via the communication network such as the portable wireless telephone network, a fixed telephone network and the like.

The sellers' host computers $6_1$ through $6_N$ are the host computers of the ticket sellers for movies, concerts, theater plays, sports and the like. Information relative to currently available tickets is stored in the databases $7_1$ through $7_N$. The reservation server 3 sells tickets of a plurality of sellers. The reservation server 3 acquires sales information about the tickets to be sold from the databases $7_1$ through $7_N$ that are connected to the sellers' host computers $6_1$ through $6_N$. The reservation server 3 may acquire the sales information from the databases $7_1$ through $7_N$ periodically or as necessary based upon users' reservation processes, or both.

Next explanation is about an example of an admission to a movie theater upon reserving a movie theater ticket with reference to the flowchart.

Figure 3:
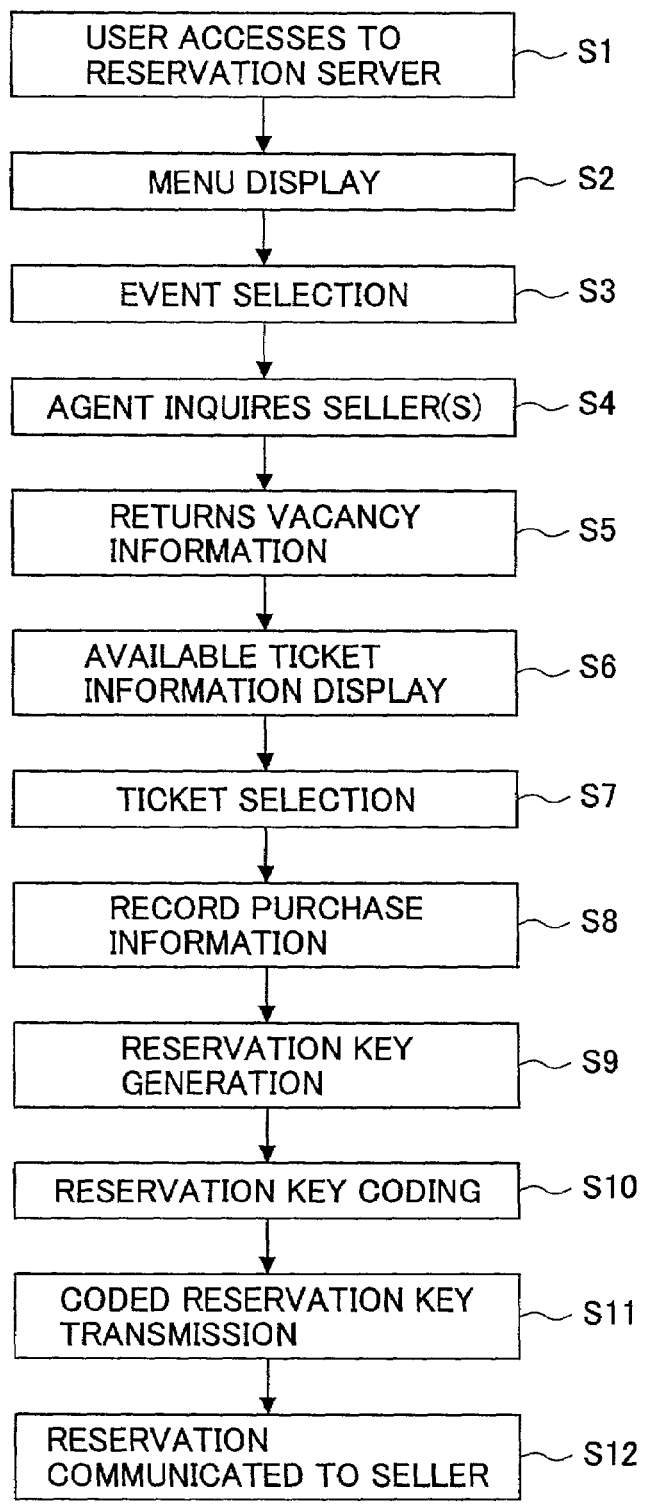
FIG. 3 is a part-1 of flowchart to explain procedures in the on-line process of the present invention.

FIG. 3 is a flowchart relative to a reservation process by a user accessing the reservation server.

The user accesses the reservation server (S1) and reaches a reservation menu screen (S2). The user selects an event, for example, a baseball match, a concert, a movie and the like, on the menu screen (S3). The reservation server asks all sellers that are related to the selected event (S4). For example, if a movie was the choice, the reservation server asks sellers about sales information of movie tickets (available ticket information and the like). The sellers transmit the vacancy information (available ticket information and the like) to the reservation server (S5). The reservation server displays available tickets (S6). The user selects a ticket (S7). The reservation server updates the reservation database according to the purchase information (S8). The reservation server generates a reservation key made of numeric values (S9) and further encrypts the reservation key (S10).

The reservation key may use the reservation number or a newly generated numeric value based on the reservation number and other information. Further, the reservation key may include a seller's name, an event name, a theater name, a seat number and the like. The reservation key is generated including information about a reserving server where there is a plurality of reservation servers.

Figure 7:
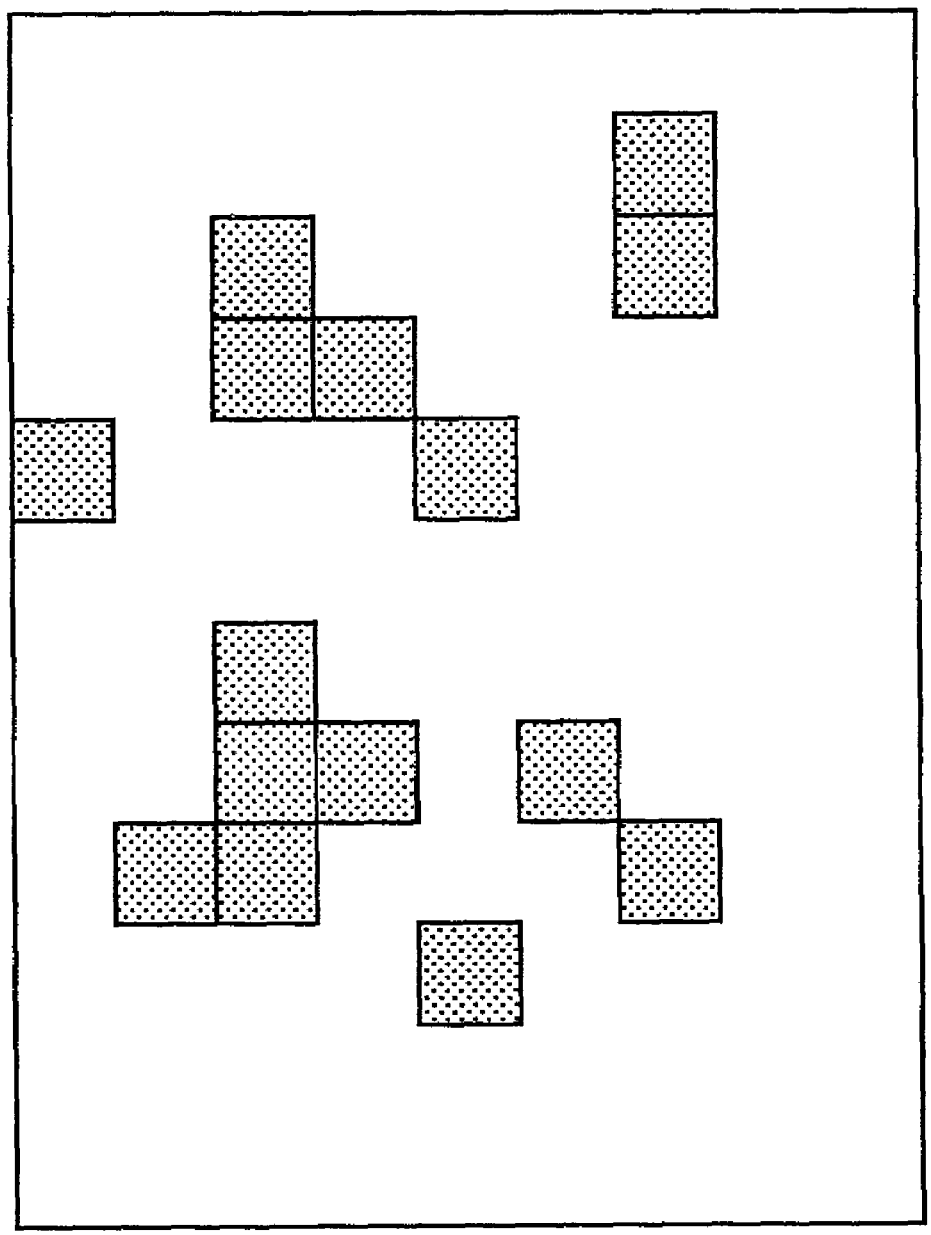
FIG. 7 explains an example of encrypting a reservation key.

Encryption of the reservation key may be performed by making the numeric reservation key to correspond to an image display (e.g. a 2-dimensional bar code) or a stream of sounds (e.g. a call arrival melody). FIG. 7 shows an example of the 2-dimensional bar code.

After encrypting the reservation key, the reservation server transmits the encrypted reservation key to a portable terminal of the generating number which is stored in the reservation database (S11).

Specifically, the reservation server 3 displays the reservation content (e.g., a movie title, a seat number, a seller's name, time, an institution name and the like) in plain text as an e-mail and transmits the encrypted reservation key (e.g., a 2-dimensional bar code). The plain text of the reservation content and the encrypted reservation key may be transmitted in HTML or a subset thereof or XTML if the portable terminal complies with HTML or a subset thereof or XTML.

Where there is a plurality of encrypting methods (the 2-dimensional bar code, the call arrival melody and the like), the reservation server 3 advises the user clarifying the encrypting method in a header or the like of the mail.

Afterwards, the reservation server advises information relative to the reserved tickets to the host computers of the sellers $6_1$ through $6_N$ with which the reservation has been made (S12). Accordingly, the databases $7_1$ through $7_N$ which are connected to the sellers' host computers $6_1$ through $6_N$ are updated.

Figure 4:
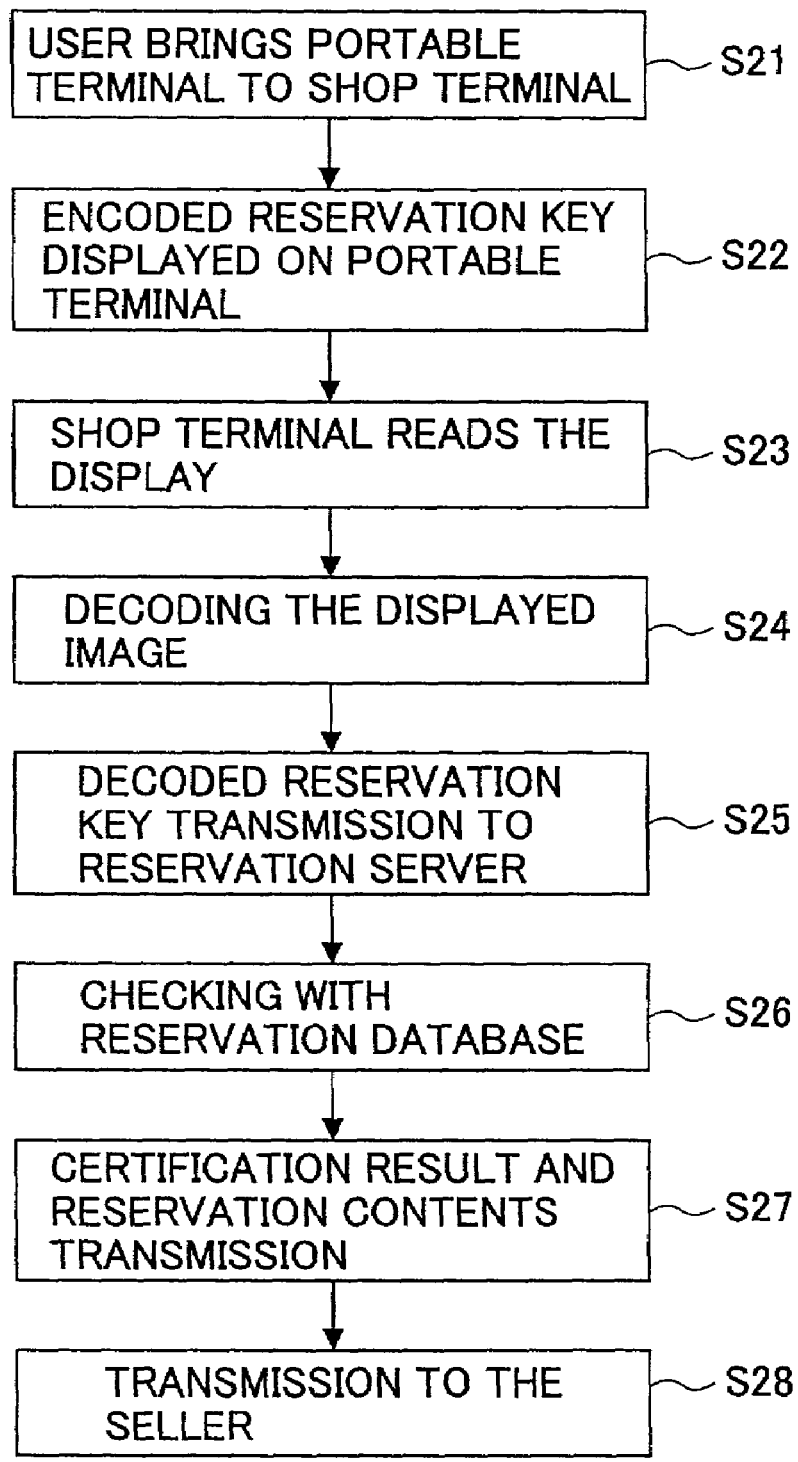
FIG. 4 is a part-2 of flowchart to explain procedures in the on-line process of the present invention.

FIG. 4 is a flowchart describing processes at the shop terminal when a user visits the shop terminal.

The user arrives at a theater (S21). The user displays the 2-dimensional bar code which is an encrypted reservation key on the display of the portable terminal (S22). The shop terminal, for example, a reception terminal of the theater, reads the 2-dimensional bar code (S23). The shop terminal decodes the bar code displayed on the portable terminal (S24).

Where there is a plurality of reservation servers, the decoded reservation key tells which server made the reservation. The decoded reservation key is transmitted to the corresponding reservation server (S25). The reservation server compares the received reservation key with the contents of the reservation database (S26). If the theater and the date and the time match with the theater and within the range of reservation date and time in the reservation key of the reservation content, an OK signal is returned to the shop terminal; otherwise, an NG is returned (S27).

In the case of OK, the reservation server transmits the reservation contents that include the date and time, the theater name, the seat number and the like, together with an authentication result. The shop terminal issues permission for user to enter and guides the user to the reserved seat if a seat is designated.

In the case of NG, the reservation server transmits a reason therefor, such as wrong date or time or theater while a reservation is made or no reservation or the like, together with the authentication result. The shop terminal restricts the user to enter, showing the reason.

In this manner, the encrypted reservation information functions as a ticket.

The reservation server also transmits the reservation information and the OK or NG result to the sellers' host computers $6_1$ through $6_N$ (S28).

Figure 5:
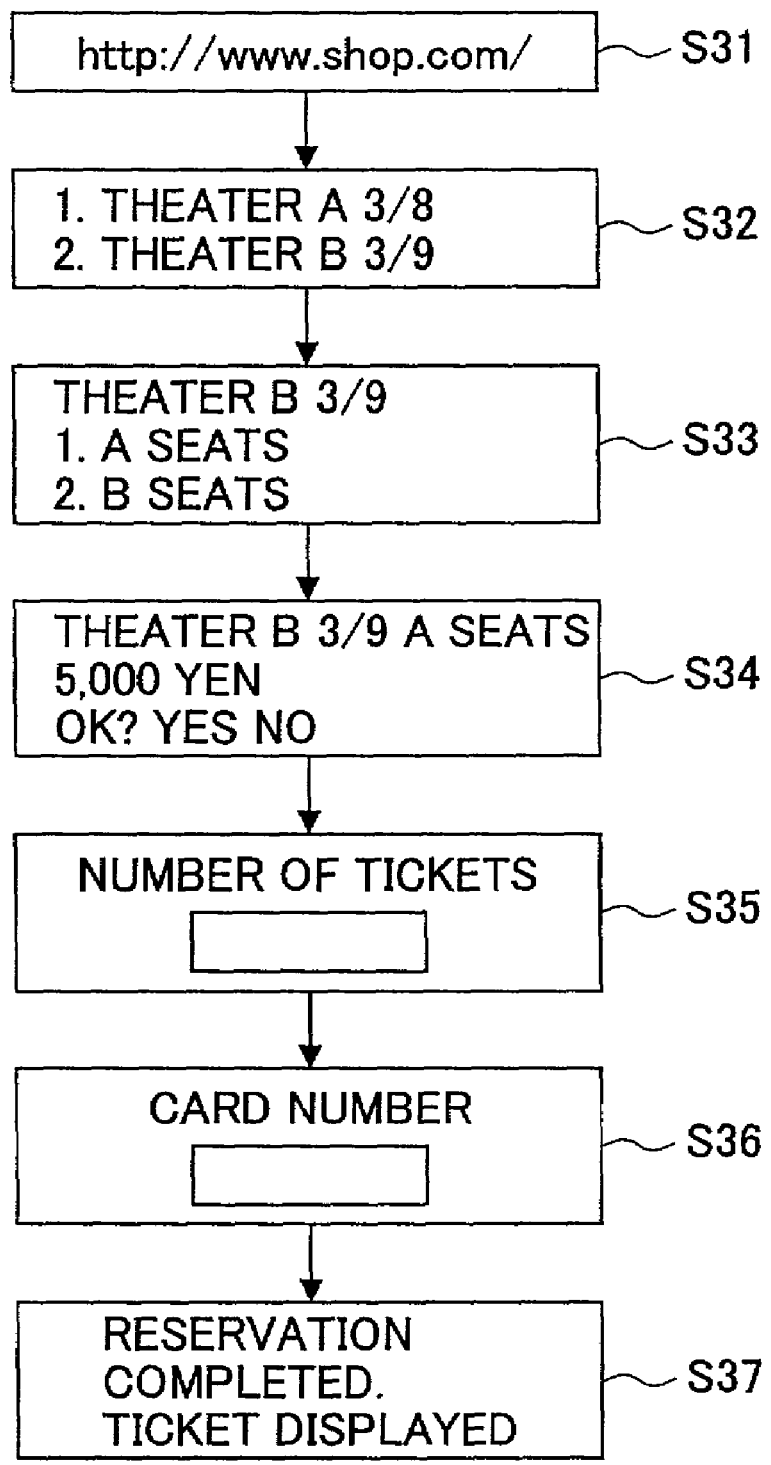
FIG. 5 is a flowchart that shows details of a part of the procedures in the on-line process of the present invention.

FIG. 5 is a flowchart that shows details of a part of the reservation process in the present invention.

A URL of the reservation server is input (S31). Then, the homepage of the reservation server is displayed (S32). There, a selection is made as regards events and the like to view a selection screen of available theaters (S32). The user selects a theater B in the theater selection screen and a seat A in a seat selection screen (S33). Upon accepting a price displayed, YES is selected (S34), a quantity of the tickets to purchase is input at an input screen for purchase quantity (S35), and a credit card number is input for payment (S36).

As the result of above, a reservation-completed message is displayed together with a reserved ticket (S37).

Figure 6:
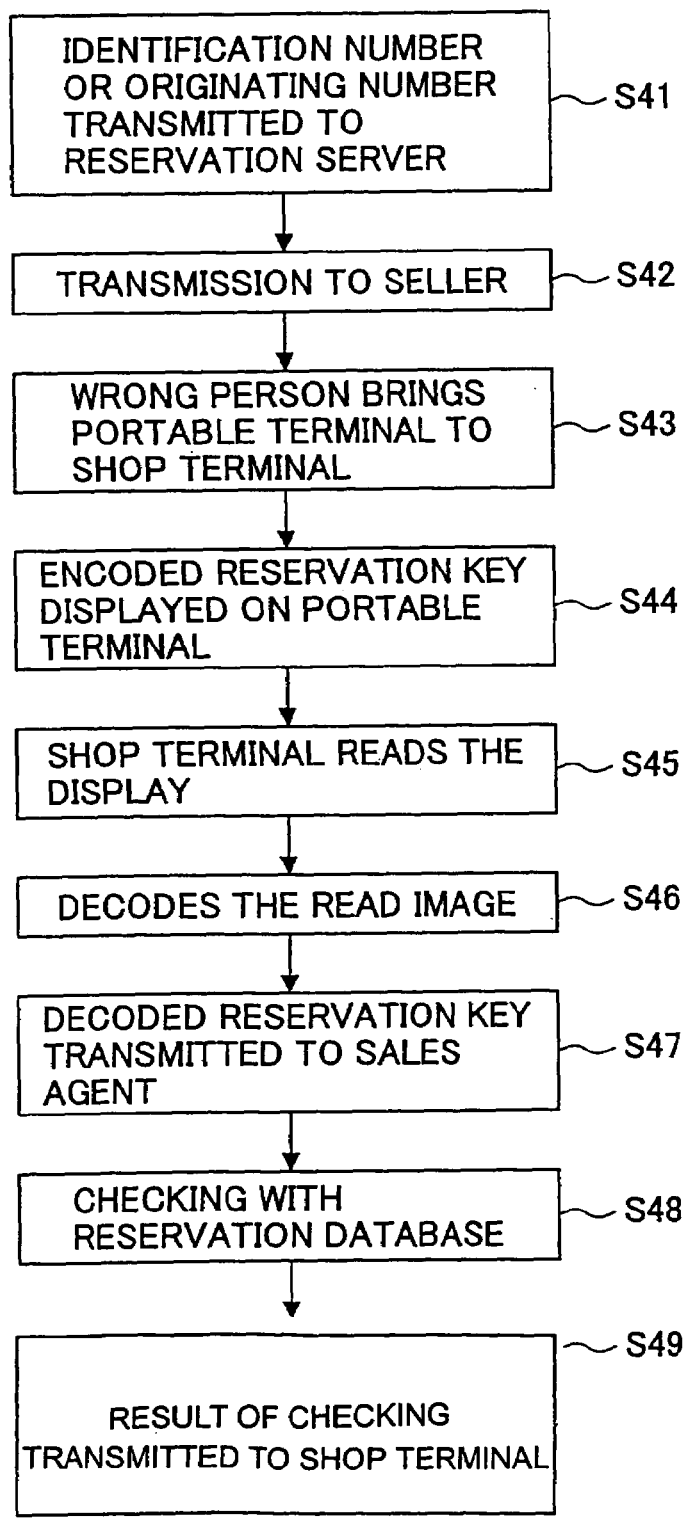
FIG. 6 is a flowchart of a process against a loss or theft in the on-line process of the present invention.

FIG. 6 shows a process step of the present invention against a loss or theft.

If a portable terminal is lost or stolen, the loss or theft is advised to the reservation server with an identification number or a generating number (S41). The reservation terminal memorizes the fact that the portable terminal was lost or stolen in the reservation database, and advises the sellers of the identification number or the generating number together with the fact of the loss or theft (S42). The reservation server posts a flag of loss or theft to the reservation information of the identification number or the generating number that is lost or stolen in the reservation database.

The lost or stolen portable terminal is brought to a shop terminal (S43). A 2-dimensional bar code that is an encrypted reservation key is displayed to the shop terminal (S44). The shop terminal (e.g., the reception terminal of the theater) reads the 2-dimensional bar code (S45). The shop terminal decodes the 2-dimensional bar code (S46). The decoded reservation key is transmitted to the reservation server (S47). The reservation server compares the received reservation key with the contents of the reservation database (S48). If the reservation key is of the lost or stolen portable terminal, the fact thereof is returned to the shop terminal (S49).

Figure 8:
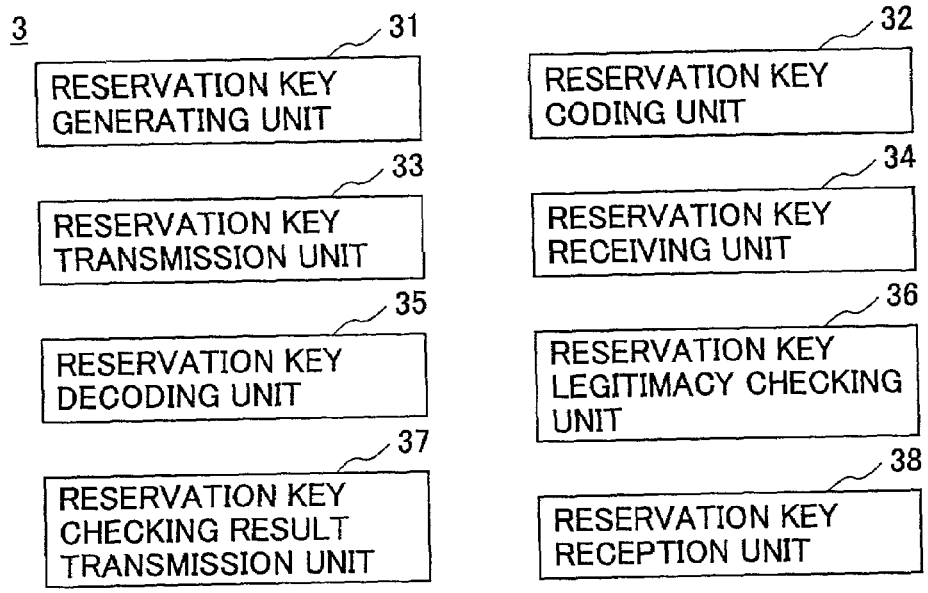
FIG. 8 is an example of a block diagram of main facilities of the reservation server.

FIG. 8 is an example of a block diagram of main facilities of the reservation server 3.

The reservation server 3 of FIG. 8 includes a reservation key generating unit 31, a reservation key encrypting unit 32, a reservation key transmission unit 33, a reservation key receiving unit 34, a reservation key decoding unit 35, a reservation key legitimacy checking unit 36, a reservation key comparison or checking result transmission unit 37, and a reservation reception unit 38.

The reservation key generating unit 31 generates a reservation key based on the reservation number and others in response with a reservation request from the portable terminal 1.

The reservation key encrypting unit 32 encrypts the reservation key. The encryption is performed by a process to convert the reservation key to a 2-dimensional display data or to audible data. The conversion is performed such that the reservation key is not recognized by human perception.

The reservation key transmission unit 33 transmits the encrypted reservation key to the portable terminal of the reserving party.

The reservation key receiving unit 34 receives the encrypted reservation key from the shop terminal 5. The received reservation key may be an encrypted reservation key or a plain text reservation key.

The reservation key decoding unit 35 decodes when the received reservation key was an encrypted reservation key.

The reservation key legitimacy checking unit 36 compares the received reservation key with the contents of the reservation database $4_1$, and determines whether or not the reservation key received from the shop terminal 5 is legitimate.

The reservation key comparison or checking result transmission unit 37 transmits a check result of the reservation key legitimacy checking unit 36 to the shop terminal 5. The reservation server 3 updates the contents of the reservation database $4_1$, and transmits the check result of the reservation key legitimacy checking unit 36 to the sellers' host computers $6_1$ through $6_N$.

The reservation reception unit 38 receives the reservation from the portable terminal and updates the reservation database $4_1$.

Figure 9:
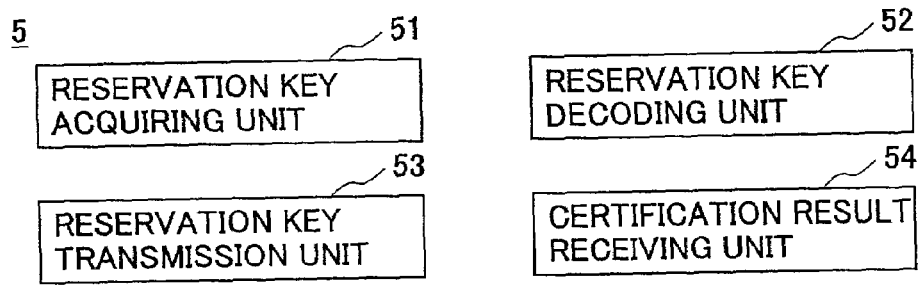
FIG. 9 is an example of a block diagram of main facilities of the shop terminal.

FIG. 9 shows an example of a block diagram of main facilities of the shop terminal 5.

The shop terminal 5 in FIG. 9 includes a reservation key acquisition unit 51, a reservation key decoding unit 52, a reservation key transmission unit 53, and an authentication or a certification result receiving unit 54.

The reservation key acquisition unit 51 acquires the encrypted reservation key. If the encrypted reservation key is a bar code displayed on the screen of the portable terminal 1, it is acquired by a bar code reading means. If the encrypted reservation key is audible sound to be output from the portable terminal 1, it is acquired by an audible tone recognition means.

The reservation key decoding unit 52 decodes the received reservation key, thereby alleviating a processing load of the reservation server 3. Further, by the decoding, reservation contents are known and if the date and time or the like is not legitimate, an immediate response can be made on the spot.

Alternatively, the shop terminal 5 may not decode the received encrypted reservation key and may transfer it to the reservation server. In this case, a process in the shop terminal 5 can be alleviated.

The reservation key transmission unit 53 transmits the acquired reservation key to the reservation server 3.

The authentication or certification result reception unit 54 receives from the reservation server 3 an authentication result relative to the reservation key transmitted.

Figure 10:
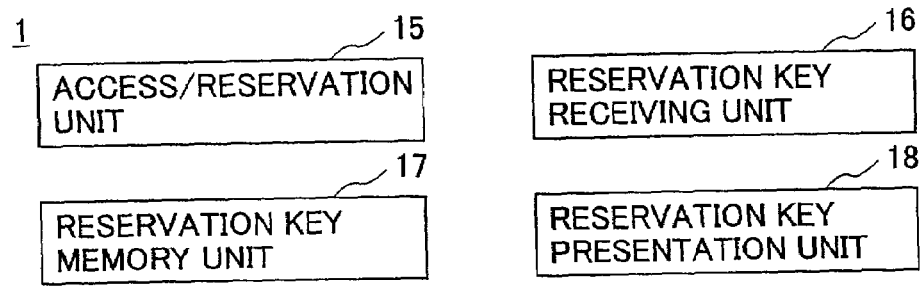
FIG. 10 is an example of a block diagram of main facilities of the portable terminal.

FIG. 10 shows an example of a block diagram of main facilities of the portable unit 1.

The portable unit 1 in FIG. 10 includes an access/reservation unit 15, a reservation key reception unit 16, a reservation key memory unit 17 and a reservation key presentation unit 18.

The access/reservation unit 15 makes a reservation by accessing the reservation server 3.

The reservation key reception unit 16 receives an encrypted reservation key from the reservation server 3.

The reservation key memory unit 17 temporarily stores the reservation key received from the reservation server 3.

The reservation key presentation unit 18 presents the memorized reservation key to the shop terminal 5 upon visiting a place where the reservation is implemented.

FIG. 11 shows an example of hardware structure of the reservation server, the shop terminal and the portable terminal which include an input unit 61 including a scanner, a keyboard, a pointing device and the like, a CPU (Central Processing Unit) 62, a ROM (Read Only Memory) 63, a RAM (Random Access Memory) 64, communication IF (Interface) 65 that interfaces with a communication network, an output unit 66 including a CRT, an LCD, a printer and the like, a disk read/write device 67, a memory card reader 68 and an internal bus 69.

Functions and facilities of the hardware itself are widely known, therefore, a description is omitted.

For the portable terminal, the scanner, the CRT, the printer and the like are equipped externally as required.

A memory medium is prepared, which records programs to process the reservation method, the reservation authentication method and the reservation confirmation method. From the memory medium, the programs for processing the reservation method, the reservation authentication method and the reservation confirmation method are read to enable the CPU 62 to execute the reservation method, the reservation authentication method and the reservation confirmation method.

The memory medium in which the programs for processing the reservation method, the reservation authentication method and the reservation confirmation method are recorded may be an HDD (Hard Disk Drive), a floppy disk, a hard disk, an optical disk (CD-ROM, CD-R, CD-R/W, DVD-ROM, DVD-RAM and the like), an optical-magnetic disk, a memory card and the like.

Above description is related to the example of selling a movie ticket for providing entertainment. However, the present invention can also be applied to service and goods sales and purchases. For example, the present invention can be applied to reservations for such service as transportation tickets, vessel tickets, airline tickets, hotels, barber shops, aesthetic saloons and the like.

The "reservation of sales/purchases" in the present invention includes reservations of sales/purchases of goods, reservations related to services and reservations relative to entertainment.

The present invention includes modes such as those in the following:

1. In the reservation key which identifies a reservation may include information to identify a reservation server and information to identify an institution to use. In this manner, a shop terminal can identify a reservation server which an access is to be made by the reservation server identification information. Further, the shop terminal can detect a mistake of a user about the institution to use when the user visited a wrong place on the spot;

2. In the reservation key which identifies a reservation, at least one piece of reserving person name information, portable terminal identification number information, portable terminal generating number information and reservation number information may be included. In this manner, the reservation server, using at least one piece of reserving person name information, portable terminal identification number information, portable terminal generating number information and reservation number information, can authorize the encrypted reservation key that is brought to the shop terminal. Through such a double and a triple checking, a reliable authentication can be performed;

3. The reserving person name information and the portable terminal identification number information may be acquired from a generating number of the portable terminal that is registered in the network. When a reservation is made from the portable terminal, the portable terminal owner and the portable terminal identification number are acquired from user management information stored in the network, and stored in the reservation database. In this manner, the portable terminal owner and the portable terminal identification number can be automatically acquired;

4. With operators separately allocated, a user of sales/purchase reservation may place a reservation order to an operator via the public network. The structure may be that the operator who receives the order registers the order to the reservation server, and transmit an encrypted reservation information to the portable terminal of the user.

5. Using a credit card as the payment instrument, a credit request may be made to a credit management server of a credit card company. In this manner, credit information of the credit company can be utilized.

6. A user of the sales/purchase reservation may advise his/her name upon reservation. The reservation server can return the name of the reserving user during an access from a shop terminal. In this manner, the shop terminal acquires the name from the reservation server to compare it with a name on an ID of the portable terminal owner for identification.

7. The reservation key or the encrypted reservation key may be encrypted by a secret key method or the like. In this manner, further security is obtained by encrypting with the secret key method or the like in addition to encrypting into the 2-dimensional display data or audible data.

8. The process of the reservation server may be linked to an inventory system of a system of a seller of goods, service or entertainment. In this manner, the database of the inventory system of the seller of goods, service or entertainment can be updated automatically to a most recent status.

9. The database of the reservation server may provide a database in which user name information and payment information are stored. In this manner, a rapid payment settlement can be performed by using the name information and the payment information in the reservation server database when the reservation server performs the settlement.

Reservation contents include purchased goods identification information, seller's name and so on for a goods purchase, specific information to identify the entertainment to be provided (e.g., year, month, date, hours, theater name and seat number) and the like in the case of entertainment, and in the case of a service, specific information to identify the service to be provided (e.g., year, month, date, departure time, generating point, destination point, flight number and seat number) and the like.

In FIG. 4, decoding is performed at the shop terminal, however, the decoding may be performed at the reservation server.

FIG. 5 exhibited an example of a credit card, however, the present invention is not limited to this but it can be applied to other payment methods.

In the present invention, implementation of a reservation means implementing reserved contents. For example, in the case of a movie reservation, it is to go to the specified movie theater on the reserved date and time to see the movie.

Further, the present invention is not limited to these disclosed embodiment examples, but various variations and modifications may be made without departing from the scope of the present invention as claimed.

What is claimed is:

1. A reservation authentication method in a reservation server which manages a reservation for sales and purchases by utilizing a portable wireless telephone system, comprising:

receiving a reservation key comprised of electronic data from a portable terminal of the portable wireless telephone system at a shop terminal provided in a store where goods are sold and/or a service or entertainment is provided, the reservation key being issued to said portable terminal from said reservation server by accessing said reservation server from said portable terminal through wireless communication with an intervening base of the portable wireless telephone system;

checking whether the received reservation key is legitimate; and transmitting a result of the legitimacy check of the reservation key to said shop terminal, and wherein the reservation key received by said shop terminal is an encrypted reservation key of 2-dimensional display data presented on a display screen of said portable terminal or audible data produced by said portable terminal.

2. The reservation authentication method as claimed in claim 1, wherein the reservation key issued by said reservation server includes reservation server identification information and/or identification information of an institution where the reservation is implemented.

3. The reservation authentication method as claimed in claim 1, wherein the reservation key issued by said reservation server includes at least one of information related to a person's name making the reservation, related to an identification number of the portable terminal, related to a number generated by the portable terminal and related to a reservation number information.

4. The reservation authentication method as claimed in claim 1, wherein transmitting the result of the legitimacy comprises transmitting a reserving person's name information relative to the checked reservation key together with the checking result.

5. The reservation authentication method as claimed in claim 1, wherein transmitting the result of the legitimacy comprises transmitting an indication of a reason for finding the reservation key not to be legitimate when the checking result finds that the reservation key is not legitimate together with the checking result.

6. The reservation authentication method as claimed in claim 1, further comprising:

payment settlement using a credit card; and requesting credit information, wherein a credit request is made to a credit management server of a credit company.

7. The reservation authentication method as claimed in claim 1, further comprising:

memorizing information about a loss and/or theft of the portable terminal;

checking whether the reservation key received from said shop terminal is a reservation key relative to the lost and/or stolen portable terminal; and transmitting an indication when the received reservation key is related to the lost and/or stolen portable terminal to said shop terminal.

8. A reservation confirmation method utilizing a portable wireless telephone system of a shop terminal provided in a store where goods are sold and/or a service or entertainment is provided, comprising:

receiving an encrypted reservation key comprised of electronic data from a portable terminal of the portable wireless telephone system owned by a person who made a reservation, the encrypted reservation key being issued to said portable terminal from a reservation server by accessing said reservation server from said portable terminal through wireless communication with an intervening base station of the portable wireless telephone system;

transmitting the reservation key to the reservation server that issued said reservation key; and receiving a checking result as to legitimacy of the reservation key from said reservation server, and wherein the encrypted reservation key is received by said shop terminal and includes 2-dimensional display data presented on a display screen of said portable terminal or audible data produced by said portable terminal.

9. The reservation confirmation method as claimed in claim 8, wherein receiving the encrypted reservation key comprises:

acquiring a 2-dimensional figure by an image reading apparatus that reads the 2-dimensional display data and/or the audible data by an audible tone recognition apparatus that recognizes an audible tone where the encrypted reservation key from said portable terminal presents the 2-dimensional figure and/or the audible tone.

10. The reservation confirmation method as claimed in claim 8, wherein the encrypted reservation key is decoded and transmitted to said reservation server.

11. The reservation confirmation method as claimed in claim 10, wherein an identity of a person who made the reservation is received and checked, where a name of the person who made the reservation relative to the encrypted reservation key is acquired by decoding.

12. The reservation confirmation method as claimed in claim 8, wherein transmitting the received encrypted reservation key to the reservation server comprises encrypting the encrypted reservation key in said shop terminal when said received encrypted reservation key is transmitted to said reservation server.

13. The reservation confirmation method as claimed in claim 8, wherein an identity of a person who made the reservation and a presenter of the encrypted reservation key is checked when a name of the person who made the reservation relative to the encrypted reservation key is received together with the legitimacy authentication check result from said reservation server.

14. A reservation server that manages reservations of sales and purchases by utilizing a portable wireless telephone system, comprising:

a reservation key receiving unit configured to receive a reservation key from a shop terminal provided in a store where goods are sold and/or a service or entertainment is provided, said reservation key being comprised of electronic data and provided to the shop terminal from a portable terminal of the portable wireless telephone system to which said reservation key was issued from a reservation server by accessing said reservation server from said portable terminal through wireless communication with an intervening base station of the portable wireless telephone system;

a reservation key checking unit to check legitimacy of the received reservation key; and a reservation key checking result transmission unit configured to transmit a result of the checking with respect to legitimacy of the reservation key to said shop terminal, and wherein the reservation key provided to the shop terminal from said portable terminal is an encrypted reservation key of 2-dimensional display data presented on a display screen of said portable terminal or audible data produced by said portable terminal.

15. A shop terminal utilizing a portable wireless telephone system provided in a store where goods are sold and/or a service or entertainment is provided, comprising:

a reservation key acquisition unit configured to acquire an encrypted reservation key comprised of electronic data from a portable terminal of the portable wireless telephone system owned by a person who made a reservation, the encrypted reservation key being issued to said portable terminal from a reservation server by accessing said reservation server from said portable terminal through wireless communication with an intervening base station of the portable wireless telephone system;

a reservation key transmission unit configured to transmit the acquired encrypted reservation key to the reservation server that issued said encrypted reservation key; and a checking result receiving unit configured to receive a checking result as to legitimacy of the encrypted reservation key from said reservation server, and wherein the encrypted reservation key acquired by said reservation key acquisition unit is comprised of 2-dimensional display data presented on a display screen of said portable terminal or audible data produced by said portable terminal.

16. A portable wireless telephone terminal that makes a reservation by utilizing a portable wireless telephone system, comprising:

an accessing/reserving unit configured to enable access through the portable wireless telephone system a reservation server which receives reservations for sales and purchases, and to make a reservation;

a reservation key receiving unit configured to receive an encrypted reservation key comprised of electronic data from said reservation server through wireless communication with an intervening base station of the portable wireless telephone system; and a reservation key presentation unit configured to present the encrypted reservation key at a vendor for which the reservation was made, and wherein the encrypted reservation key presented by said reservation key presentation unit is comprised of 2-dimensional display data presented on a display screen of said portable wireless telephone terminal or audible data produced by said portable wireless telephone terminal.

17. The portable wireless telephone terminal as claimed in claim 16, further comprising:

a display and/or audio device to indicate the encrypted reservation key received from said reservation server.

18. A computer readable memory medium that stores a program for reservation authentication utilizing a portable wireless telephone system, said program causing a computer to execute operations, comprising:

receiving a reservation key from a shop terminal provided in a store where goods are sold and/or a service or entertainment is provided, said reservation key being comprised of electronic data and provided to the shop terminal from a portable terminal of the portable wireless telephone system to which said reservation key was issued from a reservation server by accessing said reservation server from said portable terminal through wireless communication with an intervening base station of the portable wireless telephone system;

checking legitimacy of the received reservation key; and transmitting a result of the legitimacy checking of the reservation key to said shop terminal, and wherein the reservation key received is an encrypted reservation key of 2-dimensional display data presented on a display screen of said portable terminal or audible data produced by said portable terminal.

19. A memory medium that stores a program for reservation confirmation utilizing a portable wireless telephone system, said program causing a computer to execute operations, comprising:

acquiring an encrypted reservation key comprised of electronic data from a portable terminal of the portable wireless telephone system owned by a user who made a reservation, the encrypted reservation key being issued to said portable terminal from a reservation server by accessing said reservation server from said portable terminal through wireless communication with an intervening base station of the portable wireless telephone system;

transmitting the acquired encrypted reservation key to the reservation server that has issued said reservation key; and checking legitimacy of the encrypted reservation key from said reservation server, and wherein the encrypted reservation key acquired is comprised of 2-dimensional display data presented on a display screen of said portable terminal or audible data produced by said portable terminal.

20. A memory medium that stores a program for making a reservation by utilizing a portable wireless telephone system, said program causing a computer to execute operations, comprising:

accessing through the portable wireless telephone system a reservation server that accepts reservations for sales and purchases to make a reservation;

receiving an encrypted reservation key comprised of electronic data from said reservation server through wireless communication with an intervening base station of the portable wireless telephone system; and presenting the encrypted reservation key at a place for which the reservation was made, and wherein the encrypted reservation key presented is comprised of 2-dimensional display data presented on a display screen of a portable terminal of the portable wireless telephone system or audible data produced by said portable terminal.

21. A reservation authentication method utilizing a portable wireless telephone system, comprising:

issuing a reservation key to a portable telephone terminal and storing data related to the reservation key and the portable telephone terminal upon issuance of the reservation key through wireless communication with an intervening base station of the portable telephone terminal; and transmitting the issued reservation key via the portable telephone terminal to a vendor terminal for authentication, where the transmitted reservation key is authenticated based on the stored data related to the reservation key and the portable telephone terminal and the reservation key includes a 2-dimensional data presented on a display screen of the portable telephone terminal and/or audible data produced by said portable telephone terminal.

22. A method of validating a reservation, comprising:

issuing a reservation key to a portable telephone terminal and storing data related to the reservation key and the portable telephone terminal upon issuance of the reservation key; and electronically validating the reservation key of the portable telephone terminal received through wireless communication with an intervening base station via a vendor terminal based on the stored data related to the reservation key and the portable telephone terminal and 2-dimensional data displayed via the portable telephone terminal or audible data produced by the portable telephone terminal.

23. A method of validating a reservation, comprising:
validating an electronic reservation key displayed via a portable telephone terminal using a vendor terminal in accordance with stored data related to the reservation key and the portable telephone terminal, where the reservation key is 2-dimensional data having a reservation number or a newly generated numeric value in accordance with the stored data and the reservation key is received through wireless communication with an intervening base station of the portable telephone terminal.

* * * * *